J. DELGOFFE.
MACHINE FOR CARRYING, DRYING, AND AUTOMATICALLY ARRANGING PAPER TUBES.
APPLICATION FILED DEC. 27, 1911.
1,109,517.
Patented Sept. 1, 1914.
2 SHEETS—SHEET 1.
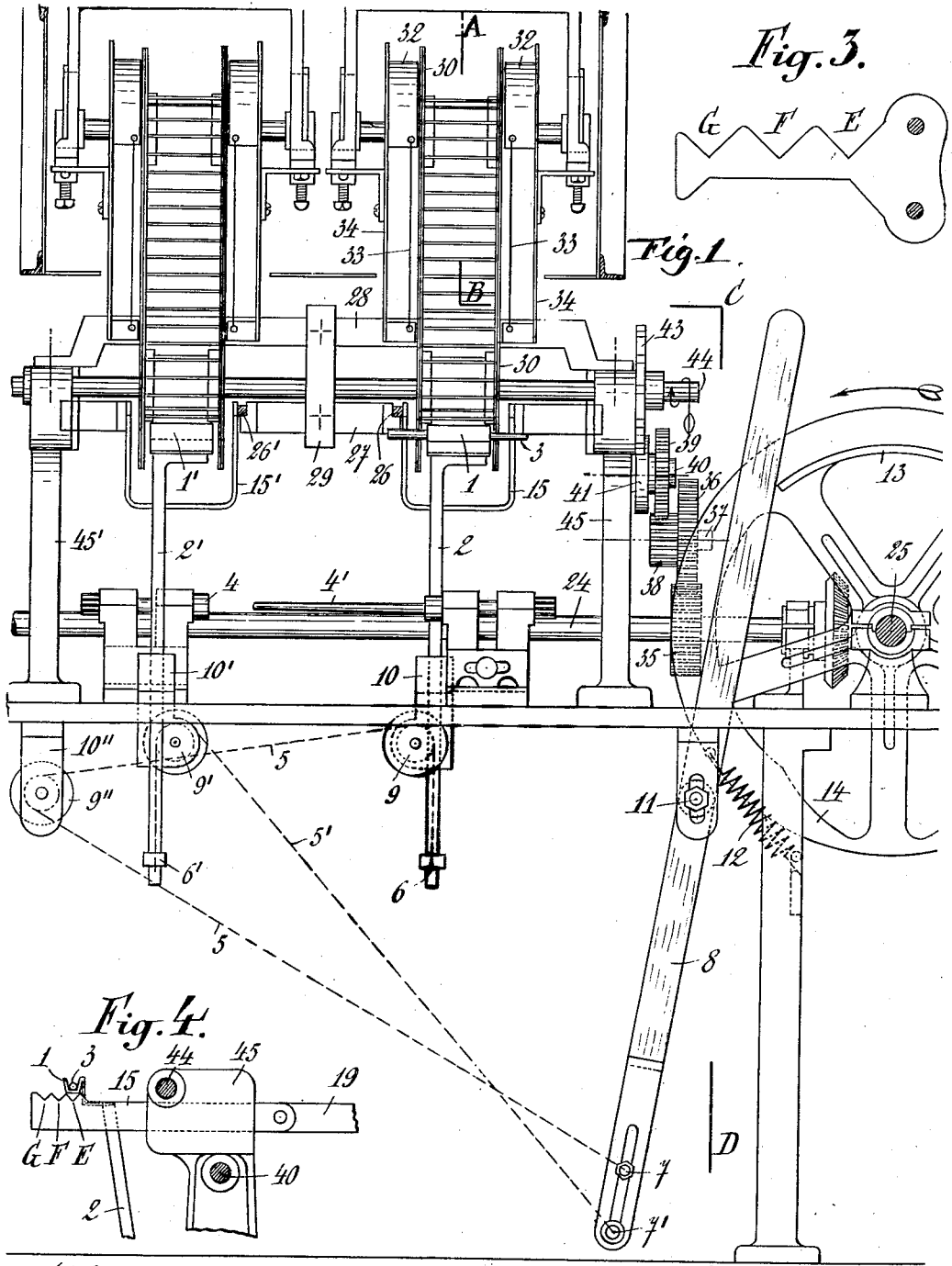

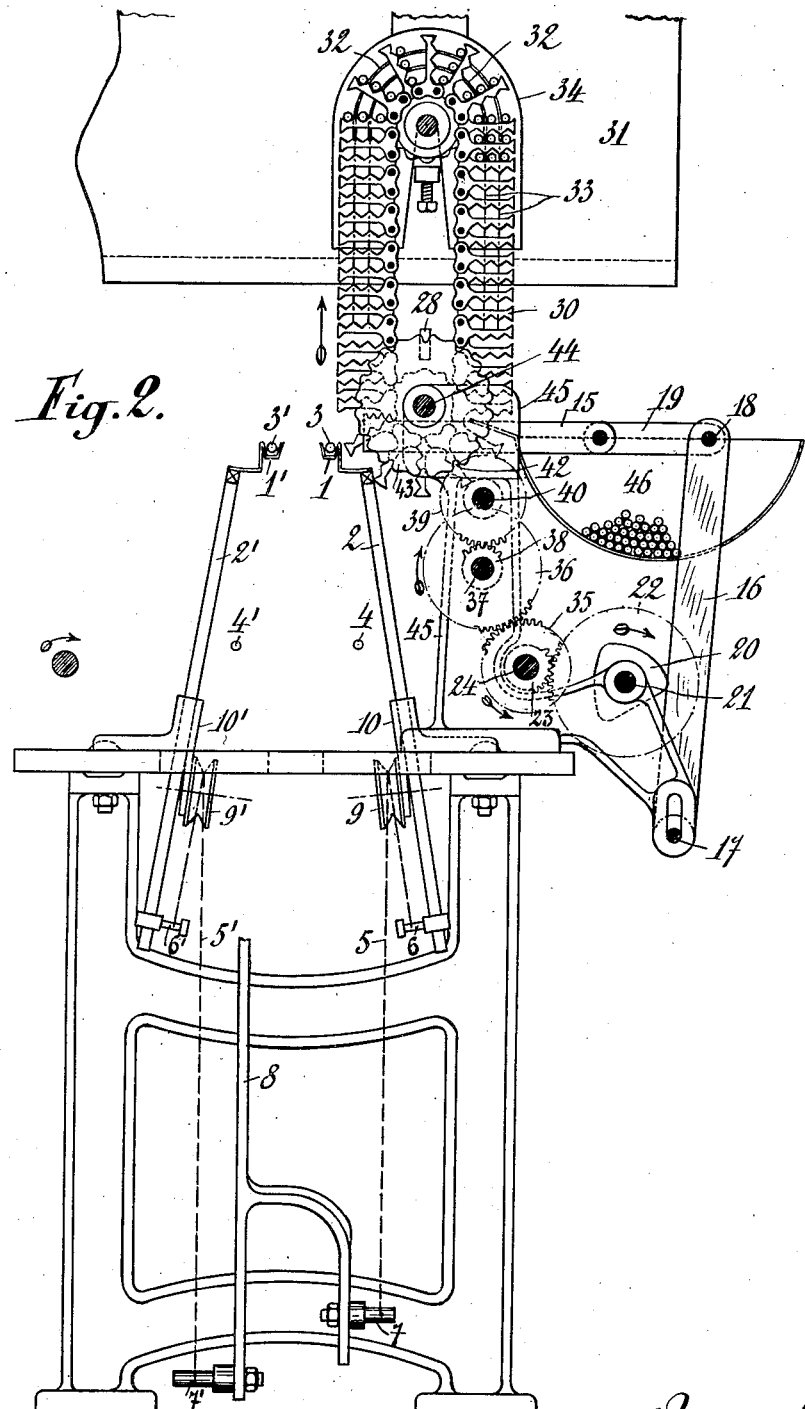

UNITED STATES PATENT OFFICE.

JOSEPH DELGOFFE, OF VERVIERS, BELGIUM.

MACHINE FOR CARRYING, DRYING, AND AUTOMATICALLY ARRANGING PAPER TUBES.

1,109,517. Specification of Letters Patent. Patented Sept. 1, 1914.

Application filed December 27, 1911. Serial No. 668,143.

*To all whom it may concern:*

Be it known that I, JOSEPH DELGOFFE, a subject of the King of Belgium, residing at 20 Rue de Jardins, Verviers, Belgium, have invented certain new and useful Improvements in Machines for Carrying, Drying, and Automatically Arranging Paper Tubes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a drying apparatus, combined with apparatus for the carriage and automatic storage of paper tubes in course of their preparation preferably on the same machine, the tubes being always kept in the same order or succession as that of their manufacture.

By the method at present in use the paper tubes fall, as soon as they are shaped, into a screen from which they are conveyed on carriages into a drying chamber and are thereafter warehoused. For such series of operations considerable labor is required and moreover the tubes are not produced in good condition since they fall pell mell into the screen and sometimes get crushed or stick one to another so that they have to be sorted out. To overcome such objections and in order to carry out automatically the various operations essentially characteristic of the invention, the machine, for making the tubes, which may be of any suitable pattern, is supplemented by an elevator which receives the tube at the moment of removal from the spindle which served to shape it and lays it upon a suitable conveyer or carrier which, after one or more movements in a plane at right angles to the direction in which the tube was conveyed thereto, places the tube in turn on a chain or equivalent or on one of several chains or equivalent. The chain, after traversing a suitable passage or chamber in which the tube is subjected to the action of a current of hot air for drying it to the requisite degree, finally deposits the tube in a receptacle or receiving pan arranged for the purpose. In this way a considerable saving both of labor and of material is effected. The necessity for sorting is done away with, and the frames and carriages required with the older systems are no longer needed. Perfectly round tubes are produced and the tubes never stick together and further, as the drying is done more regularly and uniformly the tube remains perfectly straight, while with the old method of drying on frames the upper surface of the tube was more rapidly dried than the under surface with a consequent tendency to cause the tube to bend. The sorting is done on one side only, immediately, and at the actual point of manufacture, and so facilitates the control and the supervision.

In order that the invention may be clearly understood I have hereunto appended explanatory drawings which show by way of illustration or example one form or embodiment of the invention, the drawings showing the position of the various parts at the moment when all the known preliminary operations have been completed and the elevators, loaded with tubes, are just arriving at the top of their travel and about to deposit the respective tubes on the carriers which will in turn transfer them to the chains.

Figure 1 is a front elevation of the complete machine for making two tubes and fitted with two conveyer chains. Fig. 2 is a vertical section along the line A, B, C, D, of Fig. 1, showing one of the two chains and the necessary mechanical connections. Fig. 3 shows a link of the chain, on an enlarged scale. Fig. 4 is a detail view showing separately the end of the conveyor and the position occupied by the various connections at the moment when the elevator is about to place the tube in the first notch of the conveyer.

In the case of a machine with several shaping spindles the different operations effected by the mechanism characteristic of the invention are repeated simultaneously, but to simplify the description a machine with only one spindle will be described.

After the tube making machine has completed all the operations of manufacture in the ordinary known manner, viz., the delivering up of the strip of paper to be operated on, cutting same to the length required, placing it on to the shaping spindles, cutting the strip into pieces of equal size, forming simultaneously several tubes (or it may be forming one tube only), and lastly the removal of the tubes, then, as will be seen from Fig. 2, a cup 1, or a piece of sheet metal shaped for the purpose, fixed on one or other of the elevators 2, 2¹, receives the tube 3 or 3¹ from the spindle 4 or 4¹ and is then set in upward motion by the cables 5, 5¹, which are attached at one end to the extremities 6 and 6¹ of the elevators, and at the other end to the forked extremities 7 and 7¹ of a lever 8, Fig. 2. The cable 5 passes over pulleys 9¹¹ and 9 and the cable 5¹ passes over the pulley 9¹, which pulleys are fixed to the supports 10, 10¹ and 10¹¹, which serve as guides for the elevators. The said lever 8 is arranged to move around an axis 11 which is fixed to the frame of the machine and is held by a spring 12 constantly in contact with a sort of cam piece 13 cast in one piece with the wheel 14. The rotation of the wheel 14 and cam piece 13 causes the lever 8 to oscillate and set the cables 5, 5¹, in movement in one direction or the other, and consequently also the elevators 2 and 2¹ (Fig. 1).

When the elevator 2, loaded with its tube 3, has reached the end of its upward travel (Figs. 2 and 4) a conveyer 15 with three notches E, F, G, similar to those on the links of the chain shown in Figs. 2 and 3, advances and brings under the tube 3 its most distant notch E (see Fig. 4). Then as the elevator descends the conveyer 15 receives the tube and withdraws, the elevator descending to the end of its downward travel so that the cup 1 comes again into line with the axis of the spindle 4 and below it. The elevator thereafter rises again carrying a fresh tube. The conveyer moves again and the second notch F receives the second tube when the elevator descends again and finally a third tube is lodged in the same way in the third notch G of the conveyer. The to-and-fro movement, of greater or less length, made by the conveyer 15 in a plane at right angles to the direction of travel of the elevator, is produced by a lever 16 pivoted at 17 and connected at 18 with the conveyer 15 by means of a connecting link 19. The lever 16 is acted on by a cam 20 having three working faces and according as it comes into contact with one or other of these working faces of the cam it transmits a greater or less movement to the conveyer 15. The spindle 21 of the cam 20 carries a wheel 22 which engages with a toothed pinion 23 keyed on the longitudinal shaft 24 which is driven by means of bevel gear from the main shaft 25 (Fig. 1). The conveyer 15 is in the form of a U (Fig. 1) and the branch thereof farthest removed from the point of attachment has provided thereon a projection 26 adapted to slide over the extremity of a support 27, of suitable shape, connected with the stay 28 by means of a claw 29.

When the conveyer carriage is loaded with three tubes the chain 30 (Figs. 1 and 2), which is formed with special links having three notches E, F, G, therein (Figs. 2 and 3), receives the tubes and conveys them with an intermittent movement into the drying apparatus 31. When the tubes have reached the top of the chain they must necessarily leave the notches E, F, G, in each link and take their places on the flat part of the link in advance. To prevent them damaging one another at this point, there are provided circular sheet metal guides 32 upon which the tubes roll as the change is effected. Iron wires 33 are also provided to keep them at proper distances apart on the flat portion of the links so as to prevent them sticking together in the event of their being insufficiently dried.

At the sides of the chain links and over the whole length, pieces of sheet metal 34 are fitted at intervals slightly greater than the length of a tube, so as to prevent any lateral movement of the tubes. To obtain the slow and intermittent movement required for the working of the chain 30 a pinion 35 is keyed on to the longitudinal shaft 24, and this pinion 35 engages a toothed wheel 36 carried on a shaft 37 upon which there is also carried a pinion 38 engaging a toothed wheel 39 carried on a shaft 40. On this toothed wheel 39 there is fixed a disk 41 having only one tooth 42 (Fig. 2) which engages with a twelve-point star wheel 43 keyed on to the chain shaft 44 which rotates in bearings 45 and 45¹. On these bearings are also mounted the spindles 37 and 40 as well as the shaft 44. It will be therefore apparent that for every revolution made by the disk 41, the wheel 43, and consequently the chain 30, will make only one twelfth part of a revolution. The tubes thus pass into the drying apparatus 31 into which hot air is blown by means of a fan and the tubes thereafter descend to a receiving pan 46 into which they are delivered without any risk of being damaged as they have been rendered comparatively hard by the drying.

The carrier 15 and the special chain 30, as above described, are arranged for the chain to carry three tubes per link but it will of course be evident that they could be readily adapted for a greater or a smaller number of tubes.

Fig. 1 of the drawings shows the machine with two chains, both carrying the tubes on the same side, but a larger number could be readily adapted without going beyond the limits of this invention.

Having now particularly described and ascertained the nature of my said invention and in what manner the same is to be performed, I declare that what I claim is:—

1. In a machine for making paper tubes, an elevator arranged to receive a tube, a carrier dispoesd to receive the tube from said elevator, a drying apparatus and a carrier adapted to convey the tube through said drying apparatus and to deposit it in a receptacle.

2. In a machine for making paper tubes, an elevator for receiving the tube, a carrier movable in a plane at an angle to said elevator, a drying apparatus and a carrier for receiving the tube from said elevator and conveying it to said drying apparatus and finally depositing it in a receptacle.

3. In a machine for making paper tubes, an elevator for receiving the shaped tube, a conveyer for receiving the tubes singly from said elevator and movable in a plane at an angle to the direction of travel of the elevator and a chain for receiving the tubes from the carrier.

4. In a machine for making paper tubes, an elevator for receiving the shaped tube, a conveyer for receiving the tubes singly from said elevator and movable in a plane at an angle to the direction of travel of the elevator, a chain for receiving the tubes from the carrier, and means for giving said chains an intermittent movement.

5. In a machine for making paper tubes, an elevator for receiving the shaped tube, a conveyer for receiving the tubes singly from said elevator and movable in a plane at an angle to the direction of travel of the elevator, a chain for receiving the tubes from the carrier, and means for keeping the tubes separated on said chain.

6. In a machine for making paper tubes, an elevator for receiving the shaped tube, a conveyer for receiving the tubes singly from said elevator and movable in a plane at an angle to the direction of travel of the elevator, a chain for receiving the tubes from the carrier, means for giving said chains an intermittent movement, and means for keeping the tubes separated on said chain.

7. In a machine for making paper tubes, an elevator for receiving the shaped tube, a conveyer for receiving the tubes singly from said elevator and movable in a plane at an angle to the direction of travel of the elevator, a chain for receiving the tubes from the carrier, and means for preventing lateral movement of the tubes on said chain.

8. In a machine for making paper tubes, an elevator, a cable connected at one end thereto, and a cam actuated member to which the other end of said cable is attached.

9. In a machine for making paper tubes, a conveyer, a cam, a lever actuated thereby and means for communicating intermittent to and fro movement to said conveyer by said lever.

10. In a machine for making paper tubes, tube elevating means comprising a chain having links of which one side has notches, the other side being flat.

11. In a machine for making paper tubes, means for raising and lowering the tubes embodying a chain having links and means at the top of the chain for guiding the tubes.

12. In a machine for making paper tubes, means for raising and lowering the tubes comprising a linked chain and means for guiding the tubes at the top of the chain embodying sheet metal strips concentric with the shaft, and sheet metal pieces disposed laterally with respect to the tubes.

13. In a machine for making paper tubes, a conveyer, means for preventing the tubes from sticking together, and means for preventing lateral movement of the tubes on said conveyer.

14. In a machine for making paper tubes, a conveyer, means for preventing the tubes from sticking together, means for preventing lateral movement of the tubes on said conveyer, combined with an elevator and a carrier for receiving the tubes therefrom.

In testimony that I claim the foregoing as my invention, I have signed my name in presence of two subscribing witnesses.

J. DELGOFFE.

Witnesses:
 ALBERT BÉNAZET,
 CHARLES BECKER.